United States Patent [19]
Hein et al.

[11] Patent Number: 5,717,728
[45] Date of Patent: Feb. 10, 1998

[54] DATA/CLOCK RECOVERY CIRCUIT

[75] Inventors: Jerrell Paul Hein, Driftwood, Tex.; Ramasubramaniam Ramachandran, King of Prussia, Pa.

[73] Assignee: Lucent Technologies Inc., Murray Hill, N.J.

[21] Appl. No.: 635,227

[22] Filed: Apr. 12, 1996

Related U.S. Application Data

[63] Continuation of Ser. No. 315,992, Sep. 30, 1994, abandoned.

[51] Int. Cl.$^6$ .................................................. H04L 7/00
[52] U.S. Cl. .................................................. 375/355
[58] Field of Search .................... 375/355, 342, 375/293, 340, 360, 376, 377, 238, 239

[56] References Cited

U.S. PATENT DOCUMENTS

| | | | |
|---|---|---|---|
| 3,376,385 | 4/1968 | Smith et al. | |
| 4,763,341 | 8/1988 | Murphy | 375/368 |
| 4,768,208 | 8/1988 | Cornett | 375/355 |
| 4,769,816 | 9/1988 | Hochstadt et al. | 370/100 |
| 4,821,297 | 4/1989 | Bergmann et al. | 375/120 |
| 4,881,059 | 11/1989 | Saltzberg | 341/70 |
| 4,984,249 | 1/1991 | Long et al. | 375/293 X |
| 5,025,401 | 6/1991 | Pauer | 375/313 |
| 5,195,110 | 3/1993 | Gorshe | 375/355 |
| 5,500,620 | 3/1996 | Brown et al. | 375/355 |

FOREIGN PATENT DOCUMENTS

| | | |
|---|---|---|
| A-0 345564 | 5/1989 | Germany . |
| A-0 389027 | 3/1990 | Germany . |
| WO-A-92 17967 | 2/1992 | WIPO . |

OTHER PUBLICATIONS

ATM Networks, Concepts, Protocols and Applications, Asynchronous Transfer Mode, pp. 16–19.

Transmission Systems for Communications, Members of the Technical Staff, AT&T Bell Laboratories, Fifth Edition, 1982.

Letter dated May 10, 1993, addressed to Siemens AG from Karl–Heinz Orhovsky, 3 pages with English translation.

Smart Analog Data Book, NU Horizons Electronics Corp., Crystal Semiconductor Corp., Austin, TX, 1989, CS6158, DS34PP3 pp. 2–98 – 2–99.

Databook, Exar Corporation, San Jose, CA, XR–T5684, pp. 2–58 – 2–59.

*Primary Examiner*—Stephen Chin
*Assistant Examiner*—Kevin Kim

[57] ABSTRACT

Problems associated with variations in pulse amplitude due to, for example, intersymbol interference, which can otherwise create problems in timing recovery circuits using the edges of the pulses are overcome by basing timing recovery on the center of the received pulses rather than the leading or trailing edges. Although jitter due to variations in pulse amplitude is not eliminated, timing recovery is improved because jitter due to variations in the center of the pulse are less than is jitter in the edges of the pulse.

5 Claims, 6 Drawing Sheets

DATA/CLOCK RECOVERY CIRCUIT

This application is a continuation of application Ser. No. 08/315,992, filed on Sep. 30, 1994 now abandoned.

CROSS-REFERENCE TO RELATED APPLICATIONS

This patent application is being filed concurrently with patent application Ser. No. 08/315,783, entitled "Refined Timing Recovery Circuit," (Brauns 3-5) by Brauns et al. filed Sep. 30, 1994, now U.S. Pat. No. 5,539,784 assigned to assignee of the present invention and herein incorporated by reference.

TECHNICAL FIELD

This invention relates generally to the field of communications units and particularly to such units that have timing and data recovery circuits.

BACKGROUND OF THE INVENTION

In many types of digital communications systems, the receiver must be synchronized with the transmitted information so that the information may be accurately received. That is, the receiver must know when to expect information and be able to recognize the information as 0s and 1s. To perform this synchronization function, receivers typically include timing or clock recovery circuits that establish the clock intervals for information arrival. The information may be transmitted asynchronously, and the clock recovery system must then use the incoming data to recover the necessary timing information. The received data may be retimed using the derived timing information.

Typical prior art clock recovery systems used analog phase locked loops which recovered timing information by using either the beginning or end of a pulse. See, U.S. Pat. No. 4,821,897 issued on Apr. 11, 1989 to Bergmann et al for a description of an exemplary timing recovery circuit and a general discussion of prior art. This patent is incorporated herein by reference. Analog phase locked loops, however, suffer from several drawbacks. 1) They have an internal oscillator which may be difficult to trim in mixed analog/digital circuits. 2) They have a closed feedback loop which may be subject to process variations that are difficult to control. 3) They are subject to false locking; that is, they may lock onto a harmonic of the signal frequency. 4) They are relatively slow to start up when receiving a packet. 5) They are prone to glitch induced locking. A glitch is a spurious signal.

In detecting a pulse, the receiver sets a threshold voltage level, frequently 50 per cent of the peak value, and signals above the threshold are read as 1s and signals below the threshold are read as 0s. However, many transmission systems suffer from intersymbol interference(ISI). Such interference may cause the received signal to be either larger or smaller than it would have been without interference. To prevent shifts in average amplitude due to a long sequence of 1s, 1s are often transmitted as a sequences of alternating +1 and −1; this is known as alternate mark inversion. As mentioned, this may cause the received signal to be either larger or smaller than desired; the timing edges may still move due to intersymbol interference. That is, there is considerable jitter in the timing edges which is undesirable.

Commercial literature has suggested that digital oversampling may be used. However, details of any implementation were not given in the literature.

SUMMARY OF THE INVENTION

According to an exemplary embodiment of this invention, a data communications unit has an analog unit that receives the incoming data pulse; a clock and data recovery unit connected to the analog unit, a clock smoothing unit connected to the clock and data recovery unit and a decoder connected to the clock smoothing unit. An oversampling clock is connected to the clock and data recovery unit and to the clock smoothing unit. The clock and data recovery unit determines the center of the incoming pulses to determine the timing of the incoming data pulses and to recover the clock and data from the incoming data pulses. The incoming data signal is sampled at a rate faster than the fundamental data rate, and the receiver timing is adjusted to the center of the data pulse. Timing accuracy is improved as compared to timing recovery which uses data signal edges because the jitter at the center of the pulse is usually less than the jitter at the edges of the pulse.

DETAILED DESCRIPTION

Figure 1:
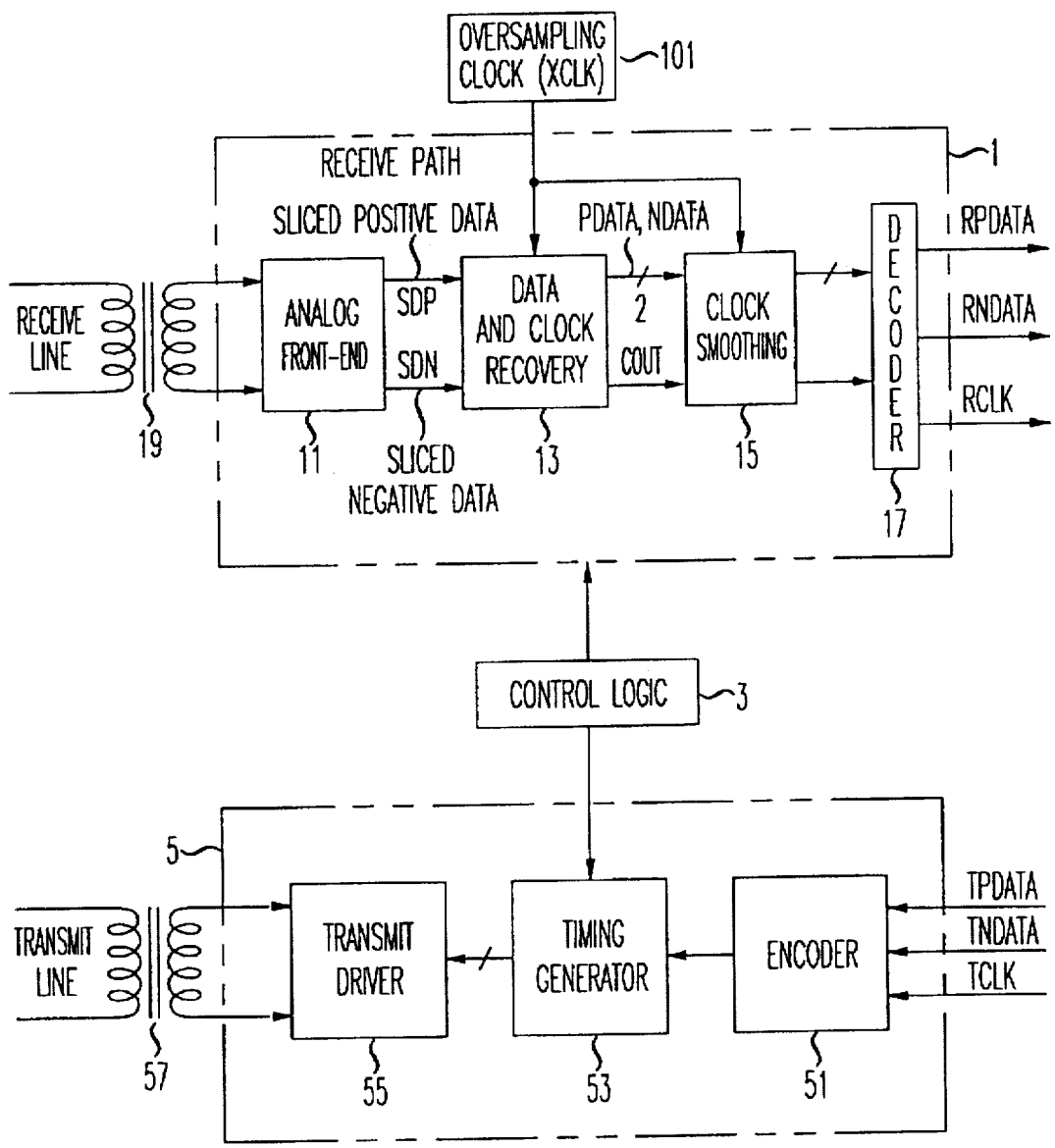
FIG. 1 is a schematic representation of a transceiver according to this invention.

The invention will be described by reference to an exemplary embodiment of the invention. Shown in FIG. 1 is a block diagram showing components of a data communications unit according to this invention. Depicted are receiver unit 1, control logic 3, and transmitter unit 5. The control logic 3 is connected to both the receiver unit 1 and the transmitter 5. Receiver unit 1 has analog front end 11, data and clock recovery 13, clock smoothing 15, and decoder 17. The analog front end 11 is transformer coupled to the receiving line 19. Oversampling clock 101 is connected to both data and clock recovery 13 and clock smoothing 15. The transmitter unit 5 has encoder 51, timing generator 53, and transmit driver 55 which are transformer coupled to the transmitter line 57. Of course, more components may be present.

The elements depicted, except for the clock and data recovery unit, are well known to those skilled in the art and need not be described in detail. The data is received as 0s, +1s or −1s. That is, an encoding system, such as alternate mark inversion, is used to transmit the data. The analog front end 11 equalizes the degraded incoming data and slices the data at a selected threshold. The sliced data, both positive and negative, is sent to the data and clock recovery unit 13. The recovered positive and negative data; that is, PDATA and NDATA, together with the recovered clock signal COUT are sent to the clock smoothing unit 15 and then to decoder 17. Positive and negative data, RPDATA and RNDATA, together with the recovered clock, RCLK, are output from the decoder 17.

The elements depicted of the transmitter unit 5 are well known to those skilled in the art. The unit will be readily constructed and operated by those skilled in the art without the necessity of further description.

Figure 2:
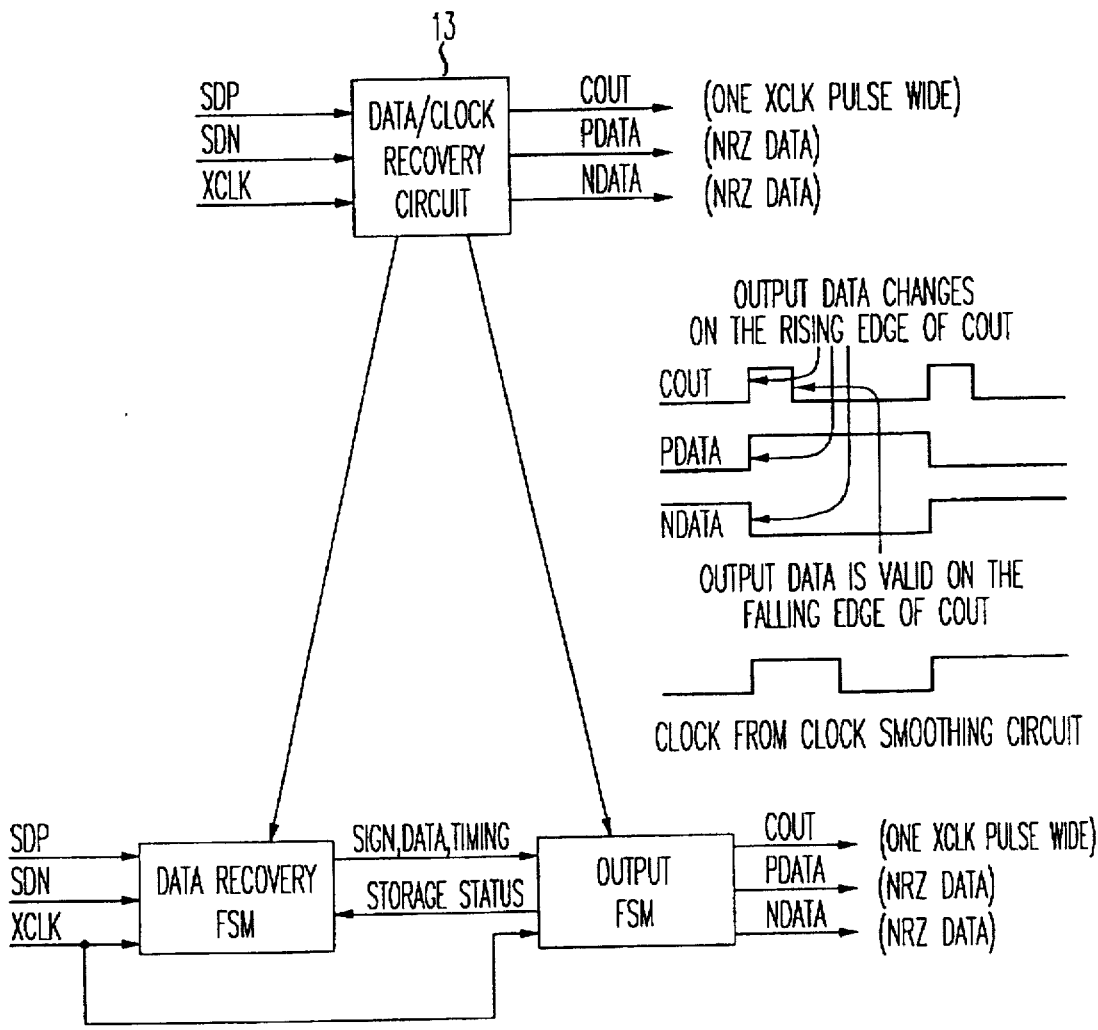
FIG. 2 is a schematic depiction of the architecture of the data and clock recovery circuit.
Figure 7:
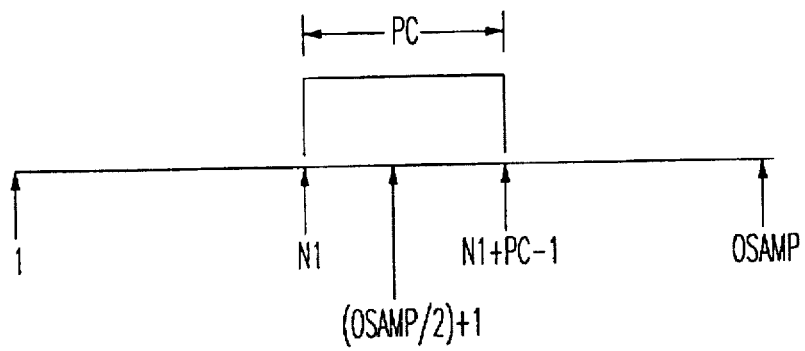
FIG. 7 is a diagram useful in explaining the determination of the pulse center.
Figure 3:
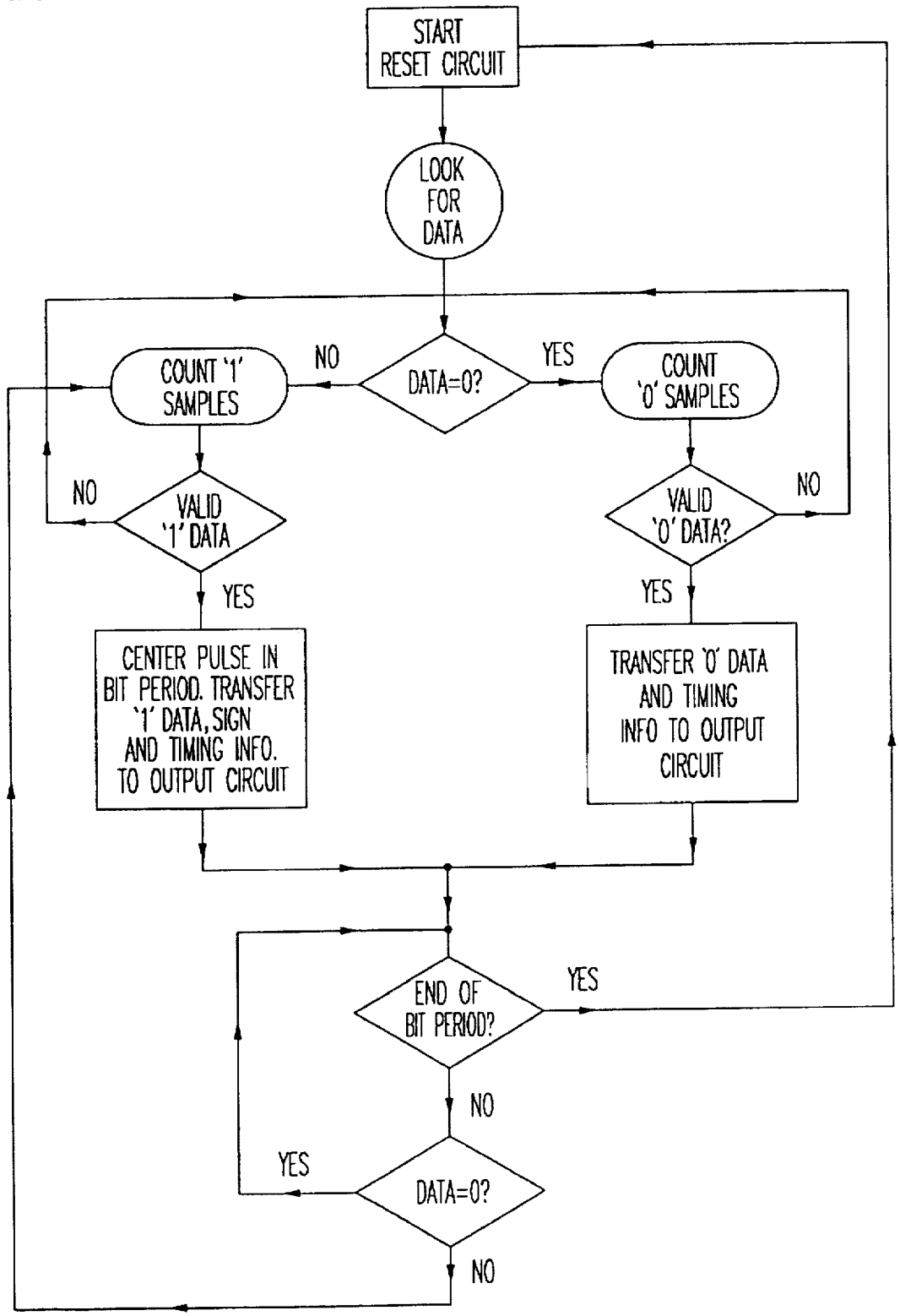
FIG. 3 is a functional flow diagram of the data recovery circuit.
Figure 4:
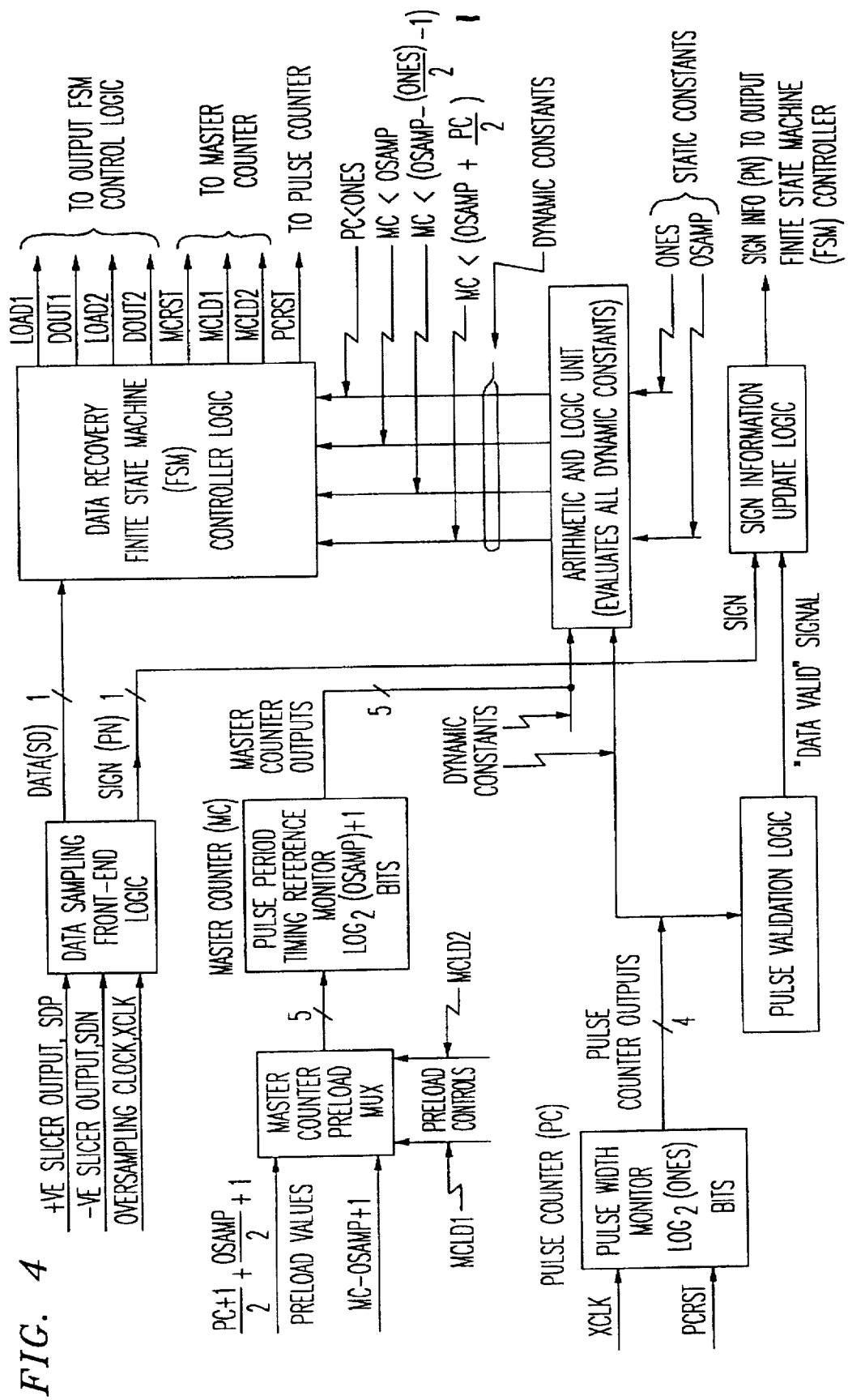
FIG. 4 is a functional block diagram of the data recovery circuit.

The architecture of the clock and data recovery unit 13 is shown in detail in FIG. 2. The data recovery unit 13 comprises two units: the data recovery circuit and the output circuit. The inputs to and outputs from these units are shown. These parts will be described in more detail. A functional flow diagram for an exemplary embodiment of the data recovery circuit is shown in FIG. 3. The flow diagram will be readily understood and implemented by those skilled in the art. A functional block diagram for the data recovery circuit is depicted in FIG. 4 for the functional flow diagram of FIG. 3. The elements of the circuit are labeled; the operation of the circuit will be described. The data sampling front end logic receives the sliced positive and negative pulses, which are referred to as SDP and SDN, respectively, and an oversampling clock XCLK. The oversampling ratio is OSAMP. A sampled data stream SD and sign information SIGN are produced. A pulse counter PC monitors the width of the incoming data pulses. The pulse validation logic validates an incoming pulse as a 1 when it meets the minimum pulse width criterion as set by the ONES parameter. The ONES parameter is determined by the application and can range from M to OSAMP-1 where M is greater than 0. Those skilled in the art will readily select an appropriate value of M. The value of M decides the glitch rejection properties of the circuit. The size of the pulse counter is governed by the maximum possible pulse width within a pulse period. When a valid pulse is received, its SIGN information is captured by the Sign Information Update Logic and is passed on to the output circuit.

The timing recovery method always tries to align the center of a pulse PULSE CENTER to the center of its period TIMING CENTER. However, the method described is general and either the rising or falling edge of the pulse may be aligned to the center of the pulse period. There are OSAMP oversamples for a pulse period. A master counter which is $\log_2$ (OSAMP) +1 bits wide, keeps track of the pulse period timing reference by trying to align the halfway point in its counting sequence to the center of the pulse regardless of when the pulse occurs in the period. This assures that the center of the pulse is always aligned to the center of the pulse period. When a valid pulse ends, the pulse width information contained in the PULSE COUNTER is processed to obtain the pulse center information and the master counter is set to the value ((PC+1)/2 +OSAMP/2+1). This value reflects the alignment of the pulse center to the pulse period center. When the MASTER COUNTER reaches the value of OSAMP, the current pulse period is declared ended, the MASTER COUNTER is set to value 1, and the timing reference for the next pulse period starts. The ARITHMETIC AND LOGIC unit(ALU) helps evaluate the pulse center and the pulse period center.

The DATA RECOVERY FSM CONTROLLER LOGIC operates on the sampled data SD, and other pulse-centering related information computed by the ALU to produce the necessary reset and preload controls for the MASTER and PULSE COUNTERS. The controller also produces the data values and the associated LOAD controls for the OUTPUT CIRCUIT as described in the following paragraphs.

Figure 5:
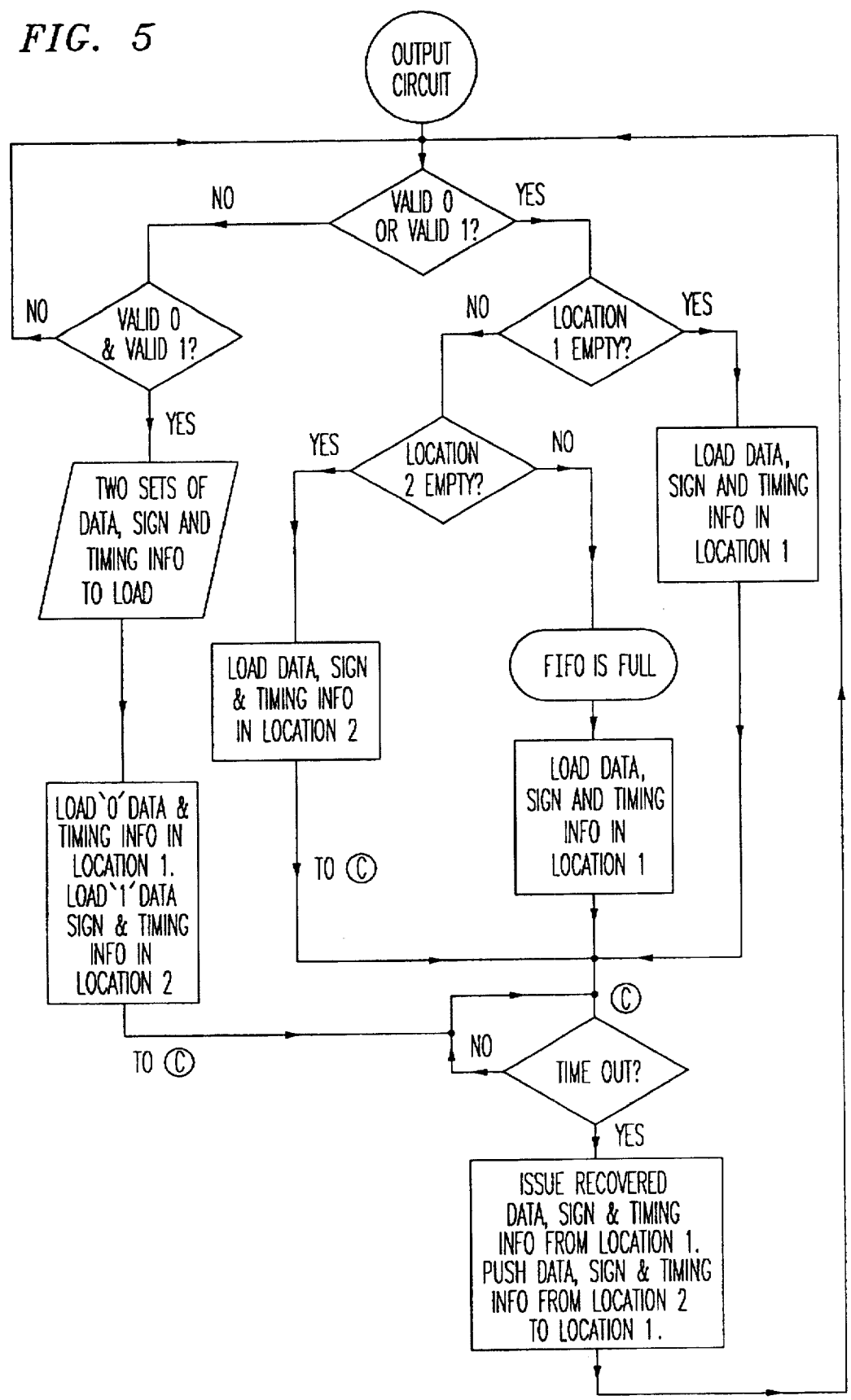
FIG. 5 is a functional flow diagram of the output circuit of the data and clock recovery circuit.
Figure 6:
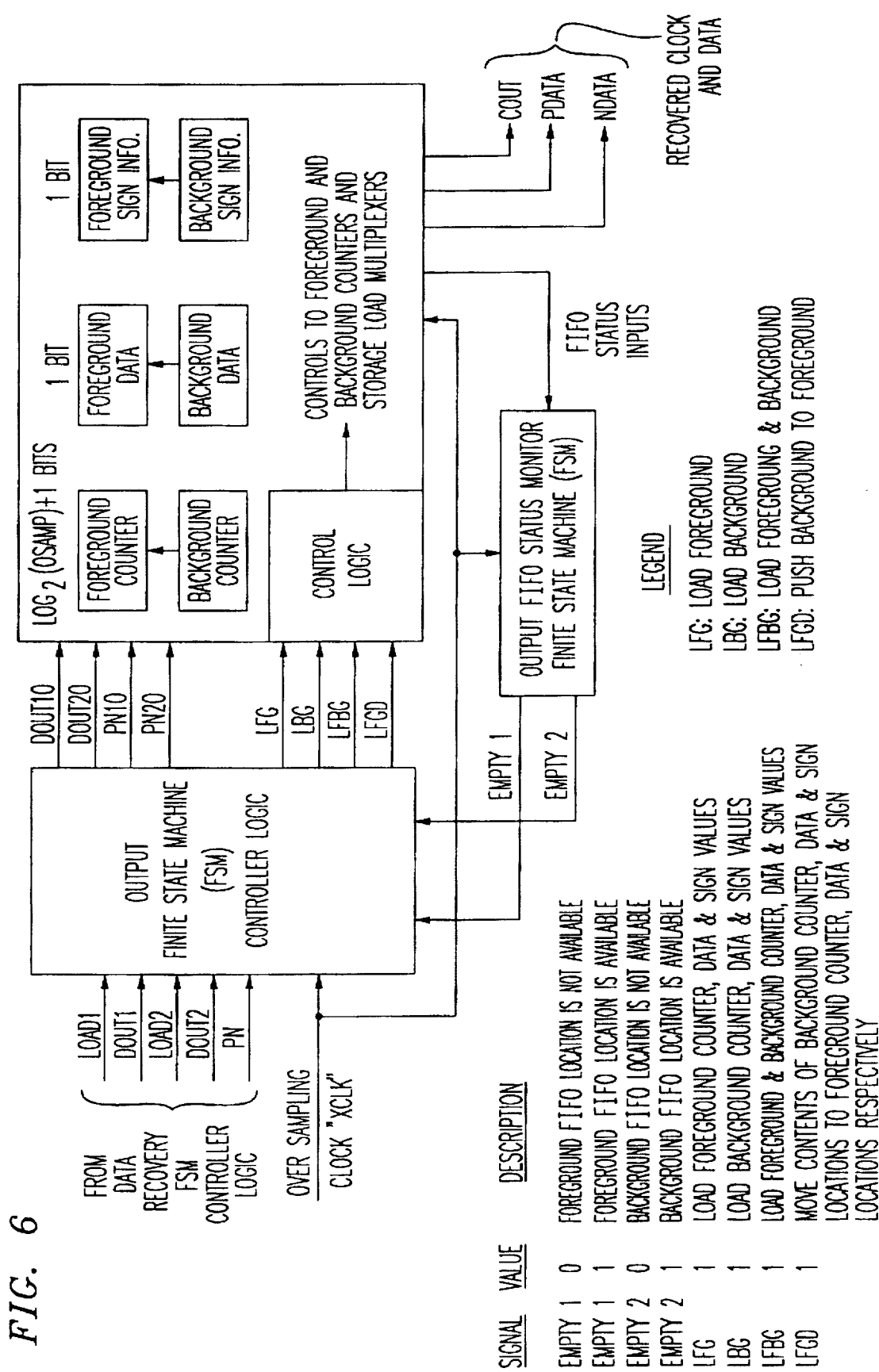
FIG. 6 is a functional block diagram of the output circuit of the data and clock recovery circuit.

A functional flow diagram of an exemplary output circuit is shown in FIG. 5. The flow diagram will be readily understood and implemented by these skilled in the art. A block diagram of the output circuit is shown in FIG. 6 for the functional flow diagram of FIG. 5. The output circuit provides the storage and time out functions for the recovered clock and data. The circuit also produces the recovered clock COUT which is one XCLK cycle wide and the positive (PDATA) and negative (NDATA) non-return to zero NRZ data. The output circuit has a FIFO, a FIFO status monitor Finite State Machine FSM and the Output Finite State Machine Controller Logic. The FIFO contains two storage locations labeled as foreground and background. Each storage location has a storage bit for the data and its sign information, as well as a $\log_2$ (OSAMP +1) bits wide counter to keep track of its associated timing reference. The counters receive the pulse period timing reference information from the data recovery circuit and provide the time out function. Both counters are the same size as the MASTER COUNTER. When the foreground counter reaches its penultimate count, the recovered clock pulse COUT is issued along with the positive PDATA and negative NDATA NRZ data. The COUT pulse is terminated when the foreground counter reaches its maximum count. At this time, the contents of the background storage locations are moved to their respective foreground storage locations. The foreground storage locations have a higher priority over the background storage location in that the output update information is always directed to the foreground location when it is available.

The OUTPUT FIFO STATUS MONITOR FSM keeps track of the EMPTY/FULL status of the storage locations in the FIFO. EMPTY1 and EMPTY2 outputs are associated with the foreground and background storage locations, respectively.

The OUTPUT FSM Controller Logic receives the data, sign and load control information from the data recovery circuit and the FIFO status information from the OUTPUT FIFO status Monitor FSM and produces the necessary load controls for the FIFO.

An explanation will be given of how the pulse center is aligned to the timing center; other alignments are possible and will be readily implemented after consideration of the following. For even numbers of sampled data and oversampling points, it is convenient to use the point right of center as the alignment point although other conventions may be used. If odd numbers of points are present, the center point may be used. If instead the pulse edge were to be aligned to the timing center, then the rising or falling edge oversampling point is used.

FIG. 5 is useful in explaining how the pulse center is determined. It is assumed that the oversampling ratio is an even number. Thus, the pulse timing center is at (OSAMP/2 +1). If a pulse of width pc starts and ends at oversampling points n1 and n1+(pc−1); by equating the pulse and timing center reference points, the value of n1 can be determined in well known manner. The value of n1, expressed in terms of pulse width and OSAMP, is given by n1=(1-pc)/2 +(OSAMP/2)+1. By resetting the master counter to the value (n1+pc) at the end of the pulse, the pulse is centered in its period. For rising edge of pulse to timing center alignment, n1=OSAMP/2+1. For falling edge of pulse to timing center alignment, n1+pc−1=OSAMP/2+1.

The analog performance metrics such as Jitter Accommodation, Generated Jitter and Jitter Transfer function, as determined by the timing recovery method described above are immune to process, temperature and power supply variations. Based on the timing recovery algorithm described here, a generated jitter of (1/OSAMP) U.I. can be achieved. A U.I. is unit interval or pulse period. This can be further reduced to (½ * OSAMP) U.I. by using both timing edges of XCLK. The clock recovery has large tolerance to jitter while transferring all input jitter to the output. Thus, the Jitter Transfer function is approximately 1.

The theoretical maximum for Jitter Accommodation in any timing recovery system is 0.5 U.L. This means that data with 0.5 U.I. of phase shift between pulses can be recovered error-free by the timing recovery system. However, this requires an infinite oversampling ratio (OSAMP) and no frequency offset between the incoming data and the oversampling clock/OSAMP. Also, in applications which allow a certain number of consecutive zeros between valid pulses, the entire peak-to-peak jitter amplitude phase shift can occur in the time between the last valid "1" pulse to the next valid "1" pulse. Therefore, for a system with a finite oversampling ratio, OSAMP, a frequency offset of "df" ppm between the incoming data and XCLK/OSAMP frequencies and "Z" consecutive zeros between valid "1" pulses, the worst case minimum Jitter Accommodation at critical jitter frequencies is given by, $$J.A. (\text{Worst Case}) = (0.5 - (1/OSAMP) - \frac{df*(Z+1)}{\left| \sin\left( \pi * \frac{f_j}{f_d} *(Z+1) \right) \right|}$$

where, OSAMP=Oversampling ratio df=Frequency offset in ppm between XCLK/OSAMP and data rate Z=Number of consecutive zeros between valid "1" pulses.

$f_j$=Jitter frequency $f_d$=Data frequency

Although the invention has been described by reference to a particular embodiment, variations will be readily apparent to those skilled in the art. For example, the data communications unit may have only the receiver portion; the transmitter is optionally present.

We claim:

1. A data communications unit comprising:
   a clock recovery unit adapted to receiving incoming data pulses, for determining incoming pulse timing; and
   a data recovery unit, responsive to the clock recovery unit and to the incoming data pulses,
   wherein the data recovery unit comprises:
      a FIFO memory having a first plurality of memory locations and a second plurality of memory locations for consecutively storing recovered data pulses and their associated timing information; and
      an output circuit that monitors at least two of the recovered data pulses and their associated timing information stored in the FIFO memory, whereby the output circuit outputs FIFO status information usable for controlling the FIFO memory.

2. The data communications unit as recited in claim 1, wherein the the clock recovery unit additionally determines the data pulse timing from incoming data pulse centers.

3. A data communications unit, comprising:
   a clock recovery unit that receives incoming data pulses and determines incoming data pulse timing from incoming data pulse centers; and
   a data recovery unit, responsive to the clock recovery unit and to the incoming data pulses,
   wherein the data recovery unit comprises:
      a FIFO memory for storing recovered data pulses and associated timing; and
      an output circuit that monitors at least two consecutive recovered data pulses and associated timing stored in the FIFO memory,
   and wherein the clock recovery unit further comprises:
      a first counter for measuring the width of said data pulse;
      means for determining the center of said data pulse;
      a second counter for providing a pulse period timing reference having a center; and
      means for aligning the center of the pulse period timing reference with the center of the received data pulses.

4. The data communications unit as recited in claim 3, wherein the data recovery unit further comprises a counter that counts the number of data samples of received data pulses.

5. A data communications unit comprising:
   a clock recovery unit adapted to receiving incoming data pulses, for determining incoming pulse timing; and
   a data recovery unit, responsive to the clock recovery unit and to the incoming data pulses,
   wherein the data recovery unit comprises:
      a FIFO memory having a first plurality of memory locations and a second plurality of memory locations for consecutively storing recovered data pulses and their associated timing information;
      an output circuit that monitors at least two of the recovered data pulses and their associated timing information stored in the FIFO memory; and
      a pulse validation logic to validate received data pulses that exceed a minimum pulse width,
      whereby the output circuit outputs FIFO status information usable for controlling the FIFO memory.

* * * * *